United States Patent [19]
Jones et al.

[11] 3,955,362
[45] May 11, 1976

[54] EXHAUST HEAT CONSERVATION

[75] Inventors: Charles M. Jones, Detroit; Hai Wu, Northville, both of Mich.

[73] Assignee: Ford Motor Company, Dearborn, Mich.

[22] Filed: Aug. 2, 1974

[21] Appl. No.: 494,270

[52] U.S. Cl. .................................. 60/274; 60/282; 60/901; 123/32 ST; 138/39
[51] Int. Cl.² .................. F01N 3/10; F02B 75/10
[58] Field of Search ............ 60/282, 302, 274, 272, 60/901; 138/38, 39; 123/32 ST, 75 B

[56] References Cited
UNITED STATES PATENTS

| | | | |
|---|---|---|---|
| 3,017,255 | 1/1962 | Norris | 60/302 |
| 3,123,900 | 3/1964 | Millar | 138/39 |
| 3,773,894 | 11/1973 | Bernstein | 60/299 |
| 3,841,568 | 10/1974 | Broad | 138/39 |
| 3,884,197 | 5/1975 | Miyaki | 123/32 ST |

Primary Examiner—Douglas Hart
Attorney, Agent, or Firm—Joseph W. Malleck; Keith L. Zerschling

[57] ABSTRACT

A method of programming exhaust gas constituents is disclosed which cooperates with a unique exhaust passage liner construction resulting in an improved self-cleaning technique for internal combustion engines. The liner comprises an apparatus which preferably subdivides the outer peripheral region of the exhaust so that the Reynolds number of the outer flow is below 2300 and therefore indicative of laminar or controlled turbulent flow. The laminar transient film between the passage wall and flow is enhanced by the transient film between subdividing walls and the flow, the composite acting to reduce the heat transfer coefficient between the total flow and wall of the exhaust passage.

21 Claims, 13 Drawing Figures

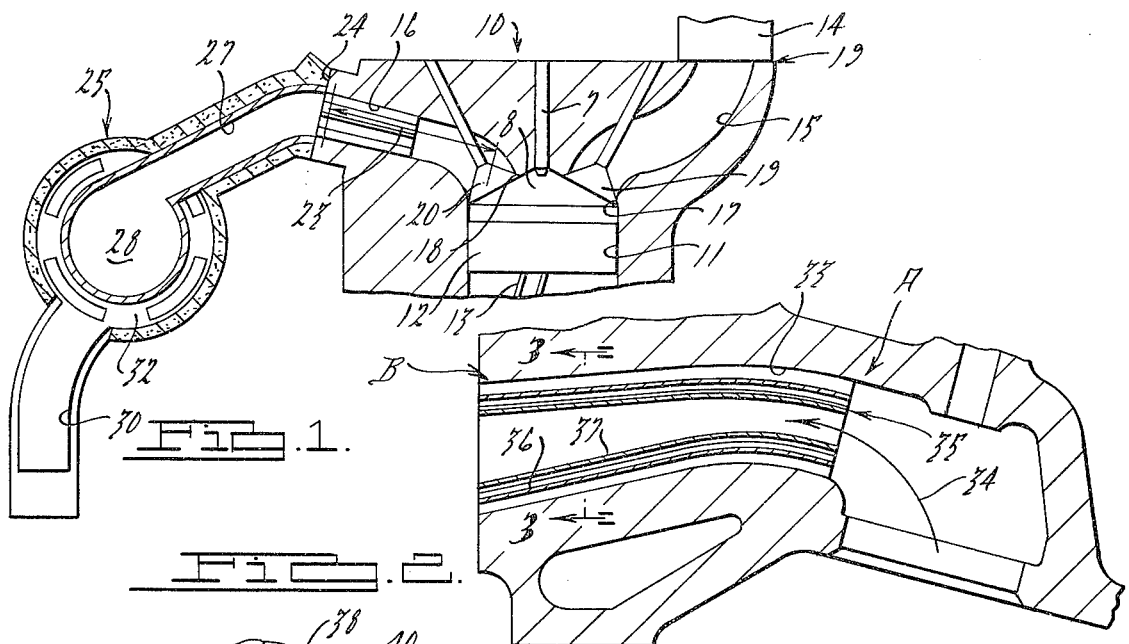
FIG. 1.
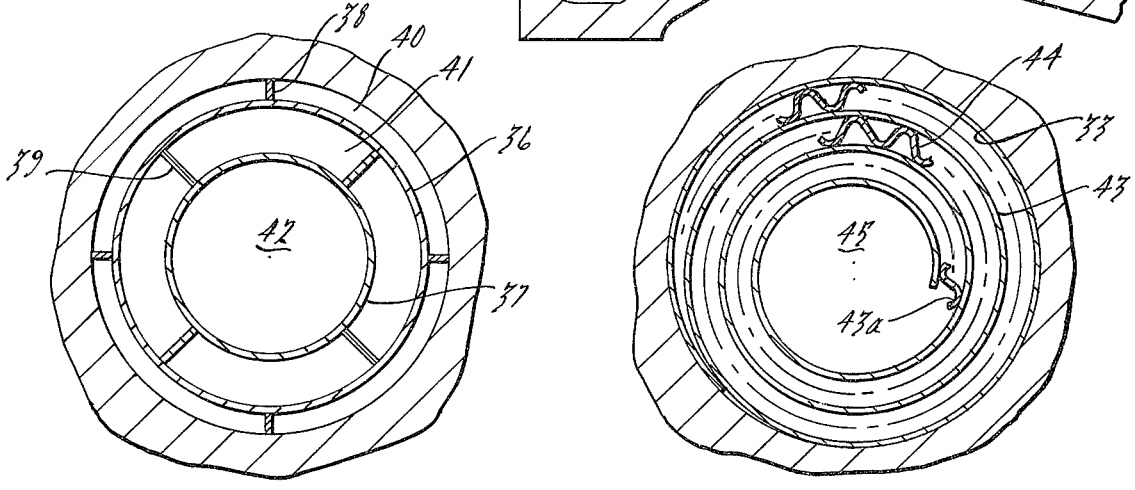
FIG. 2.
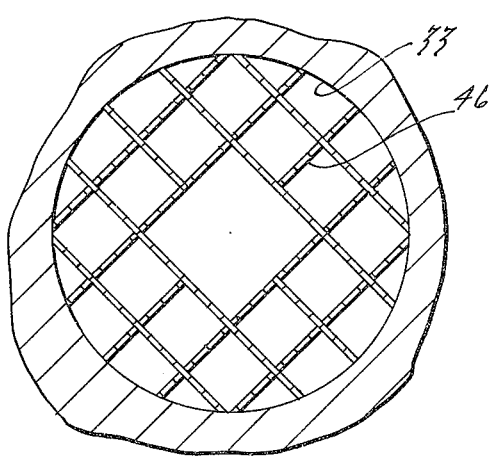
FIG. 3.
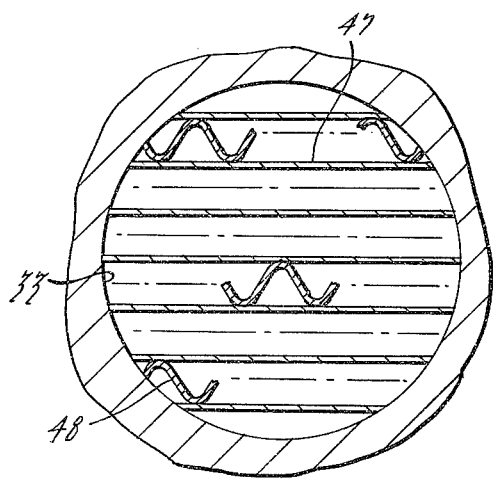
FIG. 4.
FIG. 5.
FIG. 6.

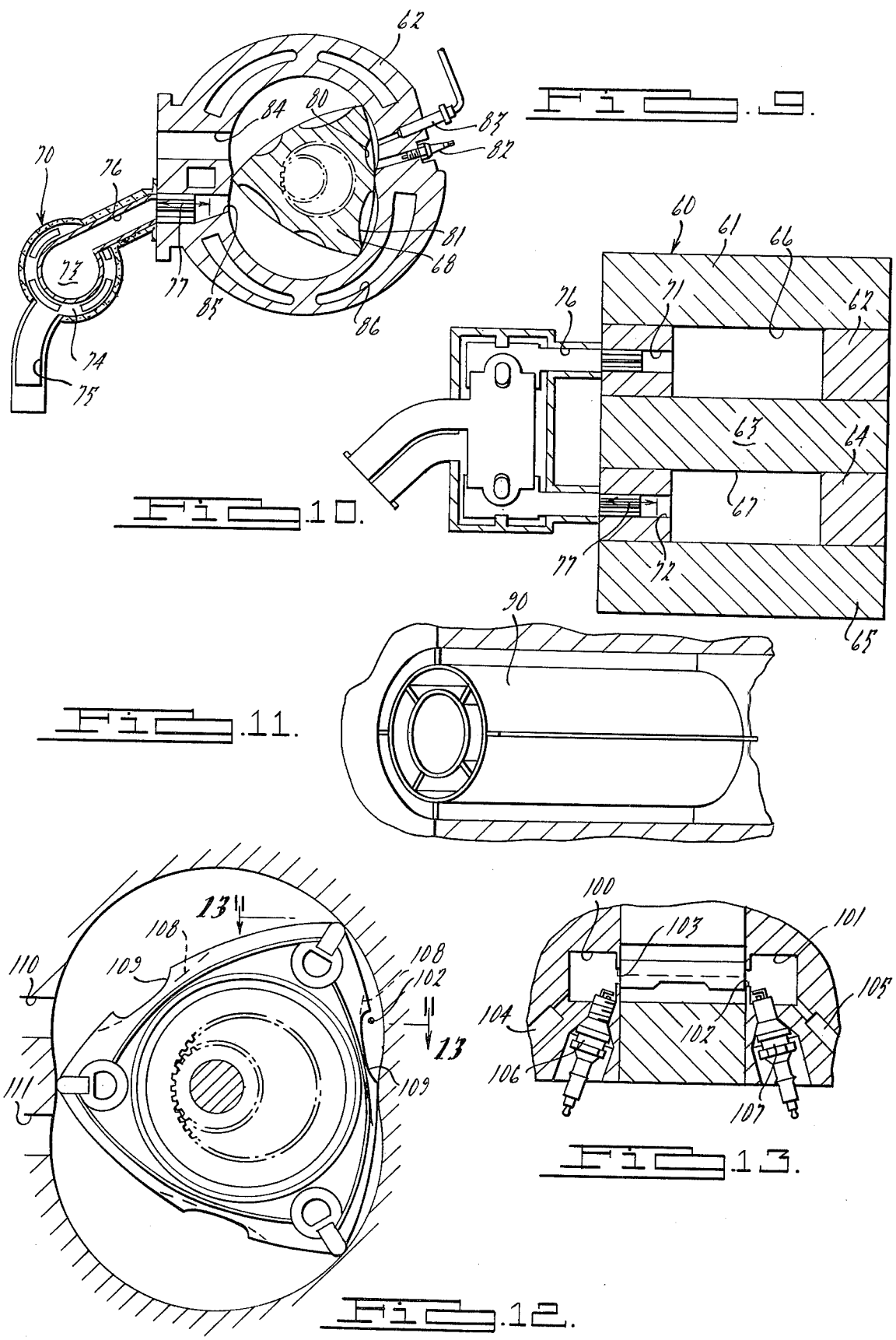

EXHAUST HEAT CONSERVATION

BACKGROUND OF THE INVENTION

With the advent of stricter governmental controls for engine emissions and with increased concern being given to weight reduction of passenger vehicles to economize fuel, there is a need for conserving the residual heat of exhaust gases of an internal combustion engine so that downstream equipment in a vehicle exhaust system may operate with higher efficiency and effectiveness to reduce the emission levels of the engine. This need has become quite apparent to the automotive industry and is currently under intense development effort. Any solution to this problem must be simple yet durable and not introduce any additional problems. Heat loss experienced by the exhaust gases, as they travel from the combustion zone through the withdrawal or exhaust passages of the engine block to exterior exhaust tubing, can be considerable. Such heat loss is accomplished by conduction, convection and radiation. This heat loss can be particularly disadvantageous to devices, such as thermal reactors which depend heavily upon a high exhaust gas temperature to react additional air or oxygen for carrying on additional chemical inter-reaction promoting further emission control. Under knowledge of the prior art to date, the ability to maintain a sufficiently high temperature of the exhaust gas in an internal combustion engine has not been fully attainable.

Attempts by the prior art to suitably preserve the heat content of the exhaust gas, prior to entrance into or actual residence within a thermal reactor have consisted primarily of providing independent material type insulators (such as air gap assemblies, metal or nonmetal blankets) in the passages leading to the reactor to prevent loss of heat through the walls of the exhaust passages around the exhaust port, or in members surrounding the exhaust passages. The problems with a cast-in insulating layer is that it is very difficult to accommodate in production castings, and may tend to generate hot spots which are potentially troublesome since they may lead to cracking.

SUMMARY OF THE INVENTION

A primary object of this invention is to provide an apparatus useful in an internal or external combustion engine which is effective to conserve the heat of the exhaust gas as it travels between the combustion zone and a short distance downstream therefrom, such apparatus must be simple, durable and operate by a mode not requiring special insulators.

Another object is to provide an apparatus effective to induce a smooth laminar flow along the walls of exhaust passage without inducing additional operating disadvantages.

Another object of the invention is to provide an apparatus effective to increase the effective raw exhaust gas release temperature (for example, by about 80°F) so as to increase the likelihood of additional chemical reaction during the withdrawal of exhaust gases from said engine.

Specific structural features pursuant to the above objects comprise the use of (a) a structural insert for the exhaust passage within the engine which is effective to subdivide the passage space in such a manner that a major portion of the exhaust gas flows uninterrupted through the center core of the said insert; (b) the structural insert is effective to induce a laminar flow through the outer peripheral zone of the said insert, devoid of local disturbances, by the use of predetermined spaced concentric sleeves; the sleeves are designed to reduce the Reynolds number of the flow at the outer portion of the said insert to less than the critical Reynolds number of 2300. (Reynolds number is a nondimensional commodity which is proportional to speed and dimension of the flow and inversely proportional to the flow or viscosity); (c) a structural insert is interposed in the exhaust passage which has subdivided passages effective to reduce the convective heat transfer coefficient at the exhaust port wall; (d) a structural insert is interposed in the exhaust passage which is effective to eliminate or reduce the cooling load about the exhaust port of the engine; and (e) the structural insert may be fabricated by either utilizing concentric sleeves spaced apart by radially directed webs, or the use of spiral would plies spaced apart by corrugated plies, or the use of a honeycomb structure which is sprayed or cast in place (the increase of pressure drop of the exhaust gas should be kept to a minimum, such as for example, no greater than 1.0%, and preferably 0.1%, of the total exhaust system pressure drop).

Yet still another primary object of this invention is to provide a novel method which is effective to increase or completely provide for a self-cleaning function of emissions within the exhaust passage immediately adjacent the combustion chamber, said method extending the chemical reactivity of the constituents of said exhaust gas. Particularly method features pursuant to the above object comprises the use of (a) an engine procedure whereby excess oxygen and a relatively moderate amount of carbon monoxide is present in the exhaust gas eminating from the combustion chamber, said method utilizing means for increasing the residual exhaust gas temperature so that said chemical elements may react in the short transient travel from said combustion chamber; (b) arranging the engine so that the air/fuel ratio is controlled to unusually lean overall ratios provided the inducted mixture is subdivided into phases (rich and lean) whereby excess oxygen and a moderate amount of carbon monoxide will be present in the exhaust gases; (c) regulating the ignition timing so as to augment a predetermined amount of excess oxygen and carbon monoxide in said exhaust gas for providing proper but limited amounts of elements necessary for said additional chemical reactivity; and (d) providing a method whereby such additional self-cleaning functions can take place in unique combination with a stratified charge type of internal combustion engine, a torch prechamber type of stratified charge combustion engine, a rotary combustion engine having stratified charge or torch ignition.

FIG. 1 is a sectional view of a first embodiment of an engine in accordance with the invention.

FIGS. 2 and 3 are longitudinal and transverse sections of an exhaust passage with the liner of the invention.

FIGS. 4–6 are transverse sections of other liner embodiments of the invention.

FIGS. 9–11 show a rotary engine in accordance with the invention.

FIGS. 12 and 13 show sections of a second rotary engine embodiment of the invention.

DETAILED DESCRIPTION

Figure 7:
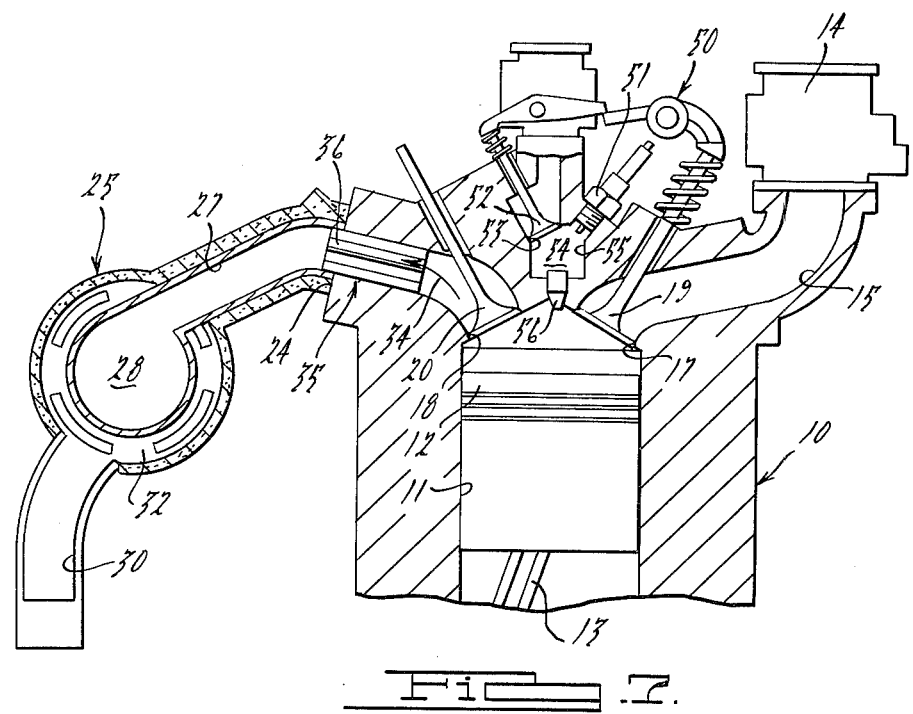
FIG. 7 is a sectional view of a stratified charge engine in accordance with the invention.

The goal of this invention is to provide an apparatus that will assist an internal combustion engine to produce lower emissions in the raw exhaust and which will program the raw exhaust gas for better efficiency in applications where a thermal reactor is utilized to modify the raw exhaust gas. This is accomplished by two critical features (a) reduction of the heat transfer coefficient through walls defining a reaction passage immediately downstream of the exhaust valve, and (b) rearranging the combustion process to assure excess oxygen in said passage. One engine mode, according to this invention, which meets these goals is shown in FIG. 1. The engine 10 has one or more cylinders 11 within which is disposed a piston 12 reciprocally operating therein; a connecting rod 13, forming part of a driven means including a crankshaft, not shown. The induction system 9 for the engine has a primary intake passage 15 effective to convey a lean phase of a combustible mixture from carburetor 14 to the chamber defined by cylinder 11 and the piston 2. A local rich phase or a combustible mixture is generated within a local zone 8 of the chamber by way of direct fuel injection from fuel nozzle 7 which enters the cylinder from a location substantially in the upper roof of the engine cover. The exhaust system for the engine comprises a relatively short passage 16 extending from the upper lefthand region of the cylinder to the exterior surface 24 of the engine block (traversing a distance 23). An assembly is utilized to control the opening and closing of the intake and exhaust passages; to this end, valves 19 and 20 are utilized respectively to control the intake port 17 and exhaust port 18. A rocker arm assembly may be used to control the timing of the opening and closing of said valves and utilizes conventional valve lifters operated by rocker arms timed to the rotation of the crankshaft for the engine.

To further reduce and modify the harmful emissions eminating from the engine, a thermal reactor 25 is typically employed, although a catalytic converter may serve a comparable function. The thermal reactor receives the exhaust gases through passage 27 which conducts such gases to an inner chamber 28 where the gases are turbulated and permitted a predetermined dwell time for oxidizing said harmful emissions; additional air or oxygen is introduced to the thermal reactor by way of a port either defined in the engine immediately at the trailing end of passage 16 in the engine block or at some early point in the entrance passage for the thermal device. After sufficient turbulization and mixing within the thermal reactor, the exhaust gases are bled to an outer chamber 32 at one end of the reactor and ultimately passed along an outlet passage 30. Suitable thermal walls are employed to retain the heat of the thermal reactor for improving efficiency since appropriate temperature of the exhaust gases is critical for chemical reactivity.

Rearrangement of Combustion Process

Figure 8:
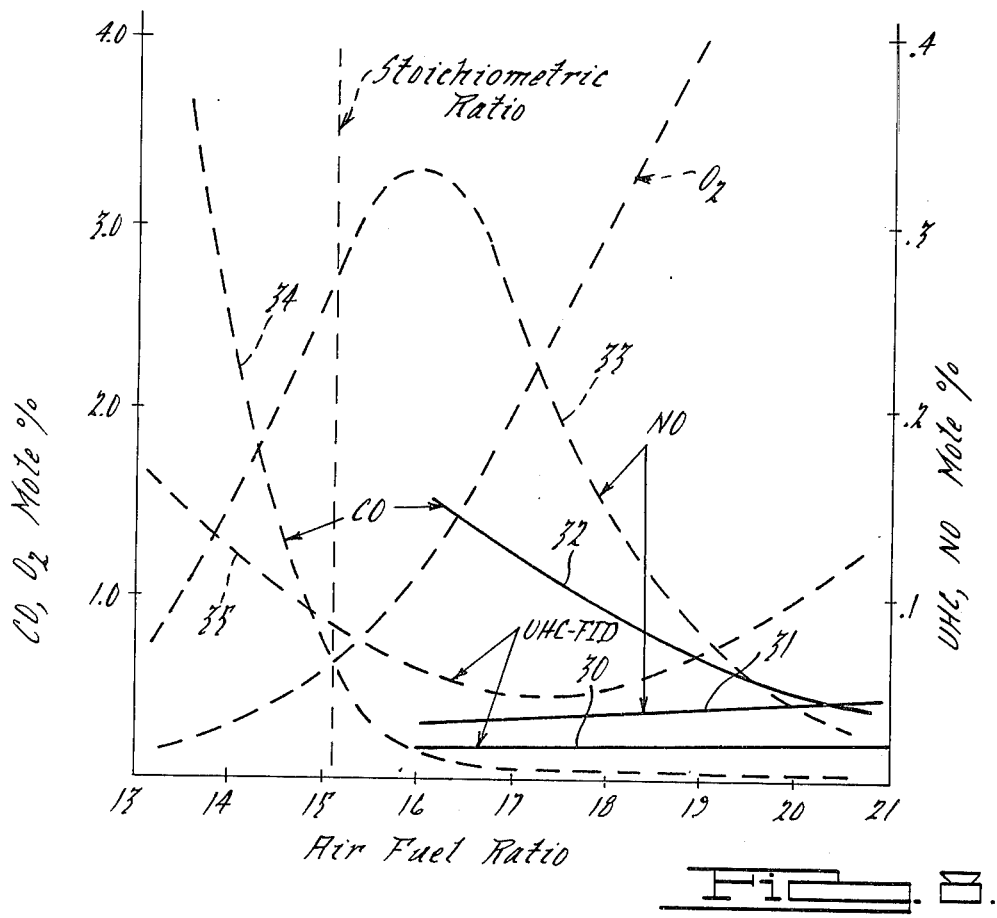
FIG. 8 is a graph of exhaust gas components against air-fuel ratio.

This type of construction wherein fuel is injected into the main cylinder is sometimes referred to as the programmed combustion process (PROCO). Stratification of the charge by injection of fuel to create a rich and lean phase for the combustible mixture results in improved combustion as best exemplified by the engine brake thermal efficiency. A high compression ratio is required for this type of two phase combustion and a net result of the combustion process is excess oxygen in the emissions. The fuel is injected during the compression stroke which facilitates a two phase (rich and lean) combustion with an overall air/fuel ratio adjustable to any level but usually kept at around 17-20:1 at part engine load and at about 14:1 at maximum engine torque. Typically exhaust gas recirculation may be utilized throughout the speed and load range, except at maximum torque; however exhaust gas recirculation is not required with the present invention. A prior art engine utilizing this concept of programmed combustion process will evidence an unburnt hydrocarbon emission content which is very low as illustrated by curve plot 30 in FIG. 8. The nitrogen oxide content (plot 31) is similarly extremely low because of the two phase combustion process. However, to CO emissions (plot 32) although moderately low fall outside the most desired arrangement established by Federal Standards.

Without the two phase combustion process and according to a typical piston type reciprocating engine, it can be seen that within the normal operating range of air/fuel ratios for such an engine, at least one or more of the objectionable constituents is higher than permissible government standards. At no air/fuel ratio to the exhaust constituents lend themselves to chemical interaction which would result in zero or very low overall emissions. For example, under rich conditions, the plot of nitrogen oxide (plot 33) and the carbon monoxide (plot 34) can interact to reduce both constituents, but there is not enough oxygen to oxidize the unburned hydrocarbons and the remaining CO. Within an extremely narrow range of air/fuel ratio near stoichiametric, the possibility of near complete hydrocarbon and carbon monoxide oxidation and simultaneous $NO_x$ reduction does exist; but no technology is available today to assure this mode of operation in a road vehicle. Under lean condition, there is enough oxygen to oxidize the unburned hydrocarbons, but there is not enough CO to interact with $NO_x$. In the so-called ultra lean region (20-20:1), the nitrogen oxide and carbon monoxide emissions are initially low and there is ample oxygen to oxidize the hydrocarbon, but the technology to operate a premixed charge road vehicle engine in this ultra lean range has not been developed as of yet and this operating mode at present entails poor engine efficiency.

One of the significant new discoveries of the method aspect of this invention is that the exhaust gas, from a two phase or multiphase combustion process, can be programmed in heat content and chemistry so that it is ideally suited for self-cleaning reactions in the exhaust system with or without a thermal reactor. The oxygen content of the raw exhaust coming from the described mode is more than sufficient to oxidize the initially low unburned hydrocarbon in any transient passage leading from the engine. This reaction takes place at normal exhaust gas temperatures (about 1315°-1400°F) without further modification. The CO and $NO_x$ constituents at and below cruise loads are very low, but during acceleration, both constituents increase to undesirably moderate levels.

It is the purpose of this invention to provide a suitable temperature catalyst whereby the reaction $2 NO + 2 CO = N_2 + 2 CO_2$ takes place which may completely eliminate but more probably reduce the CO emission and simultaneously reduce the $NO_x$ emission to less than half of the raw exhaust level. To facilitate the modified chemical interaction, it is important that the raw exhaust temperature be at least 1400°F. In the application where a thermal reactor is important and utilized, such as in FIG. 1 and other embodiments of this invention, the temperature of the raw exhaust entering the thermal reactor should be in the range of 1460°–1520°F. The simultaneous presence of excess $O_2$ and a moderate level of CO plus the high residual temperature in the range of at least 1400°, or 1460°F with a thermal reactor, will allow this continued chemical interaction to take place providing the self-cleaning function.

To assure the presence of excess oxygen, the air/fuel ratio should be controlled within the range of 17–20:1. The presence of the CO is due, first of all, to the rich phase of combustion which results in high CO concentrations. Most of the CO from this rich burning phase is oxidized inside the cylinder during the second, lean phase of the combustion. But about 0.2–1.0 mole percent remains unoxidized due to the lack of sufficient mixing during the time when the temperature is high enough. It has been found that both hydrocarbon oxidation and the interaction between NO and CO takes place simultaneously. The NO and CO emissions of the raw exhaust gas are respectively about 0.9 grams per mile and 13 grams per mile respectively without the use of the temperature catalyst of this invention. With the temperature catalyst, the CO can be reduced to a negligible level of 0.5 grams per mile level and the $NO_x$ may be reduced slightly to half its previous level or about 0.4 grams per mile. If the CO level of the raw exhaust gas is programmed to be even higher, still more $NO_x$ reduction will take place after the temperature catalyzation takes place. Further modification of the CO and $NO_x$ levels may be obtained by varying the ignition timing, as well as the fuel injection timing.

Reduction of Heat Transfer Coefficient

One of the principal discoveries of this invention is that if the character of the flow is modified between the point A (see FIG. 2) at which the raw exhaust exits from the combustion chamber and the point B at which it leaves the engine block, the heat transfer coefficient between the moving flow and the wall of the passage 33 can be reduced substantially. In conventional uninterrupted, but curvilinear exhaust passages, the flow is characterized by local disturbances which can be defined as turbulant at the transient flow film between the wall 33 and main flow 34. Turbulence or local disturbances tend to remove the portions of the transient film thickness and accordingly reduce the ability to retain heat by increasing the film heat transfer coefficient.

If a liner 35 is inserted to occupy at least a substantial portion of the exhaust passage, preferably between points A and B, and if the liner is characterized to subdivide the passage in a manner to maintain the Reynolds number for the flow below 2300 or insure that the flow is substantially (controlled turbulence) laminar. By subdividing the passage into radially spaced sections, a plurality of thinner transient flow films will occur between the subdivided flow sections, the superimposed films of the sections operating as a mechanism to reduce heat transfer by radiation or convection; the composite or transient film thickness serving to preserve a much greater heat content of the total flow.

One preferred mode of such liner is as shown in cross-section in FIGS. 2 and 3 wherein the insert 35 has a plurality of concentric sheet metal or ceramic sleeves 36 and 37 spaced radially from the wall 33 and with respect to each other by circumferentially spaced webs 38 and 39. The annular space 40, radially outward of sleeve 36, should have a radial dimension which is about 10–13% of the radius of passage 33. The annular space 41, between sleeves 36 and 38, should have a radial dimension which is about 18–25% of the radius of passage 33. The core space 42 should be uninterrupted to convey a major portion of the flow therethrough. The sleeves should be as thin as the structural strength of the material will allow, and in most cases will be about 0.02 in. for stainless steel sheet metal and about 0.05 in. for ceramic. The webs 38 and 39 are constituted as continuous thin longitudinally extending ribs, but can be segmented with an accompanying slight increase in the heat transfer coefficient. The length 23 of the liner is here about 3 inches. With this construction, the Reynolds number of the flow is reduced to below 2300 which is indicative of laminar or controlled turbulent flow.

The liner has no sleeve or wall contacting with wall 33 of the passage. Laminar transient flow films are multiplied thereby, not only along wall 33, but also along both sides of sleeves 36 and 37. The core area must offer a major unobstructed flow area to achieve optimum results with little increase in back pressure; peripheral area is thus subject to subdivision. The use of a sealed air gap between wall 33 and the liner is not contrary to this invention, but can be utilized to augment the heat retention qualities of the liner.

As a result of using the liner of FIGS. 2 and 3, the raw exhaust temperature will be about 1460°F at the exit from said liner catalyzing said chemical reactions. The walls defining exhaust port 18 may not require significant water cooling; this in turn means that there will be less hot spots for the exhaust valve and/or the cooling load will be lower. The exhaust valve guide may than be cast with the exhaust valve port resulting in less warpage.

A. HEAT TRANSFER RATE

1. Calculate Reynolds number to obtain estimate of Nusselt number
   i. Reynolds number: $Re = (V \times D_h)/\nu$
      Re = Reynolds number
      V = Gas velocity
      $D_h$ = Hydraulic diameter
      $\nu$ = Kinematic viscosity of gas
   ii. Hydraulic diameter $D_h = 4A/C$
      A = Cross-sectional area of exhaust port
      C = Circumferential length of exhaust port flow cross-section
      A = 1 × 1.5 in. = 1.5 in² = 0.0104 ft²
      C = 1 + 1 + 1.5 + 1.5 = 5 in = 0.4166 ft
      $D_h$ = 4 (0.0104)/0.4166 = 0.1 ft
   iii. Gas velocity (V)

$$V = \frac{(RPM)(\frac{1}{2})(CID)(\eta v)}{(60)(1728)(\text{no. cylinder})(A)(\text{exhaust duration})} \cdot \frac{T_g}{T_n}$$

assume as typical
{
8 cylinder engine
351 CID
4000 RPM
$\eta v = 0.7$ (volumetric efficiency)
$T_g$ = Mean exhaust gas temperature (°R), i.e. 1500°F
$T_a$ = Mean intake air/fuel mixture temperature (°R)
Exhaust duration = 280/360
}

$$V = \frac{(4000)(\frac{1}{2})(351)(0.7)}{(60)(1728)(8)(.0104)} \frac{(360)}{(280)} \frac{(1960)}{(660)} =$$
217.5 ft/sec iv. Without insert $\nu = 1.458 \times 10^{-3}$ ft²/sec
$$Re_1 = \frac{(217.5) \times (0.1)}{1.458 \times 10^{-3}} = 1.5 \times 10^4$$

v. With insert
Assume 10 to 1 reduction in hydraulic diameter
$$Re_2 = \frac{217.5 (0.1/10)}{1.458 \times 10^{-3}} = 1.5 \times 10^3$$

2. Determine Nusselt number (Nu)
i. Without insert, $Re_1 = 1.5 \times 10^4 > 2300$
for fully developed turbulent flow $Nu_s = 50$ (taken from known Reynolds and Nusselt number relationship plot such as FIGS. 8-10 in a text, entitled "Heat and Mass Transfer" By E. R. G. Eckert and R. M. Drake, Jr., page 214)
to obtain actual Nusselt number, consider entrance effect, $Nu/Nu_s = 1.8$
(see conventional entrance effect chart such as from Linke and Kunze, Allgen, Warmtech., 4:73-79 (1953)
$Nu = (1.8)(Nu_s) = (1.8)(50) = 90$
ii. With insert, $Re_2 = 1.5 \times 10^3 < 2300$
for laminar flow, $Nu_s = 3.65$
considering entrance effect $Nu/Nu_s = 1.2$
$Nu = (1.2)(Nu_s) = (1.2)(3.65) = 4.38$ 3. Determine gas side heat transfer coefficient ($h$)

$$h = \frac{(Nu \times k_f)}{D_h}$$

$k_f$ = gas thermal conductivity = 0.042 Btu/hr.ft.°F i. Without insert
$$h_1 = \frac{90(0.042)}{0.1} = 37.8 \text{ Btu/hr·ft}^2\text{·°F}$$
ii. With insert
$$h_2 = \frac{4.38(0.042)}{0.01} = 18.4 \text{ Btu/hr·ft}^2\text{·°F}$$
iii.
$$\frac{h_1}{h_2} = \frac{37.8}{18.4} = 2.05$$

This is a 50% reduction in the heat transfer coefficient with the exhaust port insert installed.

4. Finally determine heat transfer rate ($\dot{q}$)

$$\dot{q} = \mu A_s (T_g - T_c)$$

where
$$\mu = \frac{1}{\frac{1}{h} + \frac{\Delta x}{km} + \frac{1}{h_c}}$$

$A_s$ = surface area (5 × 3.38 m.)
$T_g$ = Mean temperature of the gas (typically 1500°F)
$T_c$ = Mean temperature of coolant (typically 200°F)
$h$ = Gas side film coefficient of heat transfer
$h_c$ = Coolant side film coefficient of heat transfer
$k4$ = Metal thermal conductivity (thermal conductivity of cast iron = 30 Btu/hr.ft.°F)
$\Delta_x$ = exhaust port wall thickness = 0.18 in.

(i) Without insert
$$\dot{q}_1 = \frac{5 \times 3.38}{144} \frac{1}{\frac{1}{37.8} + \frac{.18/12}{30} + \frac{1}{2000}} (1500-200)$$

$\dot{q}_1 = 5557$ Btu/hr or 1.54 Btu/sec
(ii) With insert
$$\dot{q}_2 = \frac{3.38 \times (5'')}{144} \left[ \frac{1}{\frac{1}{2000} + \frac{1}{18.4} + \frac{.18/12}{30}} \right] (1500-200)$$

$\dot{q}_2 = 2757$ Btu/hr or 0.766 Btu/sec iii. Heat transfer rate reduction $\Delta \dot{q} = 1.54 - 0.766 = 0.774$ Btu/sec iv. Increase in temperature of exhaust gas since $\Delta \dot{q} = \dot{m}c_p\Delta t$ where $\dot{m}$ is average flow rate of exhaust gas $\rho(gas) = 0.02$ lbs/ft³

$\dot{m} = \rho AV = (217.6)(0.0104)(0.02)$ $\dot{m} = 0.0452$ lbs$_m$/sec and
$c_p = 0.24$ $$\Delta t = \frac{0.774}{0.0452(.24)} = 71.3°F$$

B. Back-Pressure Resulting from Invention $$\Delta p = (\rho)(f)\left(\frac{L}{D_h}\right)\left(\frac{V^2}{2_g}\right)$$

where
$g$ = acceleration due to gravity
$\rho$ = weight density = 0.02 lbs$_m$/ft³
$L$ = port length = 3.38 in.
$D_h$ = hydraulic diameter of port = 0.1 ft
$V$ = gas velocity = 217.5 ft/sec.
$f$ = friction factor determined from conventional table such as Moody Diagram by knowing relative roughness and Reynolds number for case where engine has 315 C.I.D. at 17.6 in. Hg total back pressure at 4000 r.p.m. (no insert) and $$\frac{\epsilon}{d} = \frac{0.005''/12}{0.1 \text{ ft}} = .004166$$

then $f = 0.034$.
Accordingly $$\Delta p_1 = (.02)(.034)\left(\frac{3.38/12}{0.1 \text{ ft}}\right)\left(\frac{(217.5)^2}{64.4}\right)$$

$\Delta p_1 = 1.41$ psf or 0.00978 psi for case when at 4000 r.p.m. (with insert) and $$\frac{\epsilon}{d} = \frac{0.005/12}{0.08} = 0.00521$$

then $f = 0.029$.
Accordingly $$\Delta p_2 = (.02)(.029)\frac{3.38/12}{.08}\frac{217.5}{64.4}^2$$

$\Delta p_2 = 1.5$ psf or 0.0034 psi $\Delta p_2 - \Delta p_1 = 7\%$ increase locally, but is actually 1/10 of overall total exhaust system back-pressure.
The latter is verified by:

$$(\Delta p_1/\Delta p \text{ total}) = \frac{(0.00978)(100)}{(17.6)(0.4912)} = 0.113\%$$

$$(\Delta p_2/\Delta p \text{ total}) = \frac{(0.01)(100)}{(17.6)(0.4912)} = 0.116\%$$

The overall back-pressure increase is thus insignificant with the use of the insert herein.

Alternative Liner Configuration

Other modes of constructing a liner which accomplishes the purpose as earlier indicated, can be as shown in FIGS. 4–6. The construction of FIG. 4 employs a spiral wound ceramic ply 43 or sheet (extending the distance 23) and which is radially spaced within such spiral configuration by corrugated ceramic web 44 (also extending the distance 23). The art of forming such spiral micropassages is generally known in the art and further teaching of this aspect can be taken from U.S. patents which are incorporated herein by reference. The central core region 45 is uninterrupted by having the inner edge 43a return and close radially outwardly. The radially outer region is subdivided by the spiral corrugated ceramic composite.

Another embodiment is that as shown in FIG. 5 wherein a honeycomb structure is employed which may be produced by a gasifying mixture to achieve the porous texture having a network of minute passages in the solidified form or by interrelating lattice walls 46 at right angles to each other to form an egg-crate subdivision in the outer region. Yet still another embodiment is that as shown in FIG. 6 where a plurality of plys of ceramic material may be maintained in parallel fashion extending chordally with respect to the circumference of the passage and separated transversely with respect to each other by corrugations of comparable ceramic material.

Parallel webs 47 are separated by corrugations 48 and occupy the total interior space of the passage 33 for said distance 23. A higher back pressure for the system is experienced with this mode.

Alternative Combustion Modes

Turning now to FIG. 7, there is illustrated an engine similar to that in FIG. 1 but differing in that it utilizes a stratified charge combustion process for creating programmed exhaust constituents having excess oxygen. A liner, according to this invention, is used in the exhaust passage of the engine block and a thermal reactor is used. Members of the various parts of the engine of FIG. 7 are numbered identical to that of FIG. 1 wherein they are similar. A lean mixture of air fuel is introduced into the main cylinder 11 by way of the induction passage 15, the lean mixture being controlled by carburetor 14 forming part of the induction system 9. A separate carburetor is used to introduce a rich mixture into a small prechamber 54 defined by cylindrical wall 55; the prechamber has an induction port 53 controlled by an induction valve 52. The induction valve 52 and primary intake valve 19 are coordinated by a suitable actuating assembly 50. The spark plug 51 is located so as to ignite the mixture solely within the prechamber 54 (as opposed to locating the spark plug in the main cylinder as in the embodiment of FIG. 1). The mixture in the prechamber will burn fast, thoroughly and operate to ignite the mixture in the main chamber 11 by the way of a torch effect which exits from the prechamber through a nozzle 56 or suitable port opening. The gas in the prechamber will burn extremely fast and thoroughly, keeping CO low. The temperature drops as the flame spreads to the main chamber where the lean mixture will burn more slowly. This minimizes hydrocarbon emissions without creating undue nitrogen oxide compounds. Since the engine is a four-cycle engine, the induction phase, where the combustible mixture is sucked into both the main chamber and prechamber, will draw a portion of the rich phase into a small upper region of the main chamber 11 through the nozzle 56; however, upon the compression stroke, the rich phase will, of course, return to the prechamber where it will be ignited by the spark plug 51 located solely therein. To this end, the main chamber 11 should be made non-symmetrical so that it facilitates the return of the rich phase during the compression cycle. Furthermore, the spark plug 51 should be recessed in such a manner that the induction of the rich phase will pass into the prechamber in a manner so as not to foul the spark plug.

To insure that excess oxygen and programmed exhaust emissions result, the volume of the prechamber should be smaller in comparison to the main chamber 11 and probably should not be greater than 10%. Nozzle 56 or other equivalent communicating port should be sized in relationship to the venturi controlling the induction of the air/fuel mixture into the prechamber. It is appropriate that the air/fuel mixture inducted into the prechamber should be preheated as the fuel/mixture is preheated for induction into the main chamber; this can be accomplished by heat exchange with the exhaust gases.

To achieve optimum gas economy and smoothness of operation, the concept of the stratified charge or compound controlled combustion can be applied to a rotary engine environment. To this end, FIGS. 9–13 illustrate how this may be accomplished utilizing a thermal reactor for the exhaust system. The rotary engine is of the two rotor type and has five housings including a front side housing 61, a front rotor housing 62, intermediate housing 63, rear side housing 64 and a rear side housing 65; rotors 68 are arranged within the pair of epitrochoid rotor chambers 66 and 67 respectively and operate with a planetary type rotary motion. Each of the epitrochoid chambers have a number of variable volume chambers defined in cooperation with the triangulated type rotors 68. An intake passage 84 is provided to each of these said chambers and an exhaust passage 85, both having generally straight unlined bores, except that the exhaust passage is tapered at one end to facilitate a proper cross-sectional size at the entrance to the epitrochoid chamber. The thermal reactor 70 is constructed similar to that of FIG. 1 wherein raw exhaust gases pass along conduit 76 and enter into a main turbulizing chamber 73 for further reduction of chemical compounds dependent upon time dwell and the temperature therein. The reduced gases enter peripheral region 74 and exit by way of passage 75. An exhaust passage of liner 90 is disposed in each of the exhaust passages 85 and extend for a distance 77 which substantially occupies a major portion of the passage within the rotor housings. The liner may be of a construction as illustrated in any of the FIGS. 2 through 6 and is shown in FIG. 11 as having, preferably, two concentric rings each spaced in proportion, as previously described, from the passage wall 76. The longitudinal extent of the liner may be straight thereby increasing the ability to establish laminar or controlled turbulent flow along the outer region of the exhaust passage and thus optimizing the decrease of the heat transfer coefficient.

However, to provide for excess oxygen in the raw exhaust, one of two modes should be used. The first mode is as that illustrated in FIG. 9 wherein a dimple 80 is defined in each of the outer faces of the rotor in addition to the conventional compression pockets 81 defined for facilitating primary compression in the stage as illustrated in FIG. 9. Fuel, rather than being introduced as a mixture through the intake passage 84, is introduced solely by way of a nozzle 83 into a port located adjacent the dimple 84 when the rotor is in or adjacent the position as shown in FIG. 9. The single injector nozzle feeds a rich mixture into both cavities, as the rotor is passing the injector station. As the rotor turns, the leading pocket 81 and accompanying cavity expands, thinning the rich mixture into a lean proportion. However, the trailing cavity, which operates in conjunction with dimple 80, maintains its size right up to the point of ignition. Thus, a rotary action itself forms a main chamber in which the mixture is lean and the ignition starts in a suitable prechamber (cooperating with the dimple) wherein the mixture is rich — precisely the type of conditions that are set up for operation of the construction of FIG. 7. Thus, the dual phase combustion can be controlled to create programmed exhaust gas constituents having excess oxygen as necessary to the aspect of this invention.

It is also possible to stratify or have a dual phase combustion in a rotary engine merely by controlling two fuel mixtures introduced through conventional induction passages. Thus, there would be provided at least two separated intake portions to the rotor cavity, one could be a peripheral intake port and another could be a side wall intake port. The ports are connected to receive air and fuel in different proportions and are arranged relative to the path of the rotor motions so that one intake port will remain open longer than the other during the intake phase, thereby providing a controlled peripheral variation of the air/fuel mixture applied to each of the working chambers. Thus in the vacinity of top dead center, there will be a rich air/fuel mixture in the trailing region of the working chamber and a lean air/fuel mixture in the leading region. A spark plug igniter arranged, such as in FIG. 9, to ignite the rich air/fuel mixture will accomplish similar results to that as shown in using the fuel injection nozzle.

Probably the most advanced engine which will provide optimum advantages in conjunction with the invention herein would be that as shown in FIGS. 12 and 13. This engine is a rotary type which could be constructed with one or more rotors and accompanying chambers; a thermal reactor can be used, but preferably it can be operated without a thermal reactor and still achieve the same emission levels as that required by stringent Federal standards. To this end, the raw exhaust is programmed to have a high amount of excess oxygen by introducing fuel to two prechambers 100 and 101 disposed at diametrically opposite sides of the epitrochoid chamber, each of the prechambers having a limited port 102 and 103, respectively, effective to regulate the blast or torch effect for igniting the lean combustible mixture in these main chambers. Suitable nozzles 104 and 105 are disposed to inject a fuel for creating a rich air/fuel mixture in each of the prechambers. Spark plugs 106 and 107 are arranged to be easily packaged within the side housings on opposite sides of the rotor housing and ignite the mixture within the prechambers. The symmetrical and opposite positioning of the prechambers facilitate an improved flame propagation within the main epitrochoid chamber whereby increased fuel economy and lower emission result while capitalizing on the smaller engine and weight requirements of a rotary engine and its manufacturing simplicity. The combustion pocket 108 of the rotor in the face of the rotor can be of a rather elongated configuration having side access ports 109 leading to the prechamber when the rotor is in the position as is shown in FIG. 12; note the positioning of the intake passage 110 and exhaust passage 111 containing the liner construction as described in FIGS. 2–6.

We claim as our invention:

1. A method for controlling exhaust emissions from an internal combustion engine, comprising:
   a. inducting two phases of a combustible mixture into a combustion zone of said engine, one phase having a rich and the other a lean fuel component so that the average air/fuel ratio of both said phases is in the range of 17–20:1 at part engine load and about 14:1 at maximum torque whereby combustion will take place with excess stoichiometric oxygen,
   b. compressing and combusting said two phases of said mixture, said combustion being initiated in the rich phase so that exhaust gases resulting therefrom will contain a lower amount of unburned hydrocarbons and nitrogen oxides than carbon monoxide and oxygen, and
   c. controlling the withdrawal of exhaust gases from said combustion zone through a passage immediately adjacent said zone, said passage being defined by an outer wall and having an inner space thereof with at least the outer peripheral zone thereof subdivided to insure that flow therethrough is substantially coherently streamlined with little or no local disturbances, said flow having a reduced convective heat transfer coefficient to retain a greater amount of heat of said exhaust gases so that a higher temperature can be maintained resulting in chemical reaction of the CO and $O_2$ content of said exhaust gases to provide a self-cleaning function.

2. The method as in claim 1, in which said engine is arranged so that the lean phase of said mixture is inducted into the main portion of said combustion zone and a rich phase is created locally within said zone by direct injection of fuel.

3. The method as in claim 1, in which the two phases of said mixture is produced by induction of a rich phase into a prechamber communicating with said main chamber by way of a torch nozzle, the lean phase being inducted directly into the main chamber.

4. The method as in claim 1, in which the two phases of said mixture is introduced to a rotary internal combustion engine, said engine having minor and major cavities formed in the periphery of each rotor and cooperating to define major and minor chambers with said rotor housing, each minor cavity being in communication with a major cavity, fuel being injected directly into both of said cavities but ignition being initiated after the major chamber has slightly expanded and at a time when the minor chamber is at a minimum volume whereby the rich undiluted phase is ignited first.

5. The method as in claim 1, in which the internal combustion engine is of the rotary type, said engine having symmetrically arranged prechambers 6. For use in an internal combustion engine having a mass defined by a block enclosing a combustion zone in one part of said mass, an apparatus for modifying the flow character of exhaust gases, comprising:
  a. an unlined passage extending through the mass of said engine and originating from the combustion zone of said engine, said passage having an outer wall and an interior space with an outer peripheral zone and an inner peripheral zone, and
  b. means in said passage subdividing at least the outer peripheral zone of said space to effectively reduce the Reynolds number of flow through at least said outer peripheral zone to a value below 2300 whereby the heat transfer coefficient between said flow and wall is reduced.

7. The apparatus as in claim 6, in which said means reduces said Reynolds number to a value sufficiently below 2300 whereby said flow in the peripheral zone is not only laminar and substantially devoid of uncontrolled turbulence, but the exit temperature of said exhaust gas flow is increased at least 5% as a result of a reduction in convective and conductive transfer or heat between said flow and engine mass.

8. The apparatus as in claim 6, said subdividing means is comprised of substantially concentric sleeves at least two in number, one being spaced about 1/10 of the radius from said outer wall and the other sleeve being spaced from said one sleeve by about 1/15 the radius of said passage.

9. The apparatus as in claim 6, in which said means is comprised substantially of cylinders or segments thereof, each defined to offer little rsistance to flow therethrough with said subdividing means having only the thickness of elements comprising said means facing the direction of flow.

10. The apparatus as in claim 6, in which said subdividing means comprises a ceramic network having plies of impervious ceramic material arranged in a spiral within said passage, said plies being separated by corrugated ceramic material spacing said plies in a predetermined radial distance.

11. The apparatus as in claim 6, in which said subdividing means comprises a honeycomb network of ceramic material extending from the entrance to the exit of said passage, the honeycomb network providing a plurality of passages therethrough, each having a transverse dimension no greater than 10% of the radius of said passage.

12. The apparatus as in claim 6, in which the length of said passage is at least 2.5 times the diameter of said passage, but no greater than 5 times.

13. The apparatus as in claim 6, in which the increase in back pressure of said exhaust flow is no greater than 1% of the entire exhaust system of said engine.

14. The apparatus as in claim 6, in which said means is separated from the exhaust passage wall by thin longitudinally extending webs between which the outer peripheral flow passes and whereby the raw exhaust release temperature is increased by about 80°F.

15. The apparatus as in claim 6, which further comprises means defining a trapped air space between said subdividing means and said passage.

16. In an internal combustion engine, having a housing containing at least one primary combustion chamber and induction means for supplying two phases, rich and lean, of a combustible mixture to said chamber, said engine having means for controlling the timing of intaking, compression, expansion and exhaust cycles, the improvement comprising:
  a. means for igniting said rich phase to initiate combustion, said rich phase and lean phase together having an average air/fuel ratio in the range of 17–20:1 at part engine load and about 14:1 at maximum torque whereby combustion will take place with excess stoichiometric oxygen,
  b. passage means through which exhaust gases from said combustion must pass to be released from said housing, and
  c. means subdividing at least a portion of the interior of said passage means so that laminar flow is substantially devoid of local disturbances resides in the peripheral regions of said passage means.

17. The engine improvement of claim 15, which further comprises a thermal reactor for receiving the exhaust gases released from said engine housing.

18. The improvement of claim 16, in which said engine has at least one exhaust valve controlling the release of exhaust gases and has a cooling system for maintaining the temperature of said housing within prescribed limits, said subdividing means serving to reduce convective and conductive transfer of heat to said housing thereby not only reducing the total cooling load of said system but also eliminating the need to carry said cooling system immediately adjacent said exhaust valve.

19. The improvement as in claim 15, in which at least one prechamber is provided in communication with said primary chamber and into which said rich phase is provided, the communication being said prechamber and primary chamber being controlled to effect a torch for igniting said lean phase.

20. The improvement as in claim 19, in which the induction means has separate venturies for providing supplying said respective combustible mixtures, the communication being sized to be less than the size of the venturi associated with the prechamber induction venturi.

21. The improvement as in claim 15, in which said engine is a rotary internal combustion engine.

* * * * *